H. D. JAMES.
MOTOR CONTROL SYSTEM.
APPLICATION FILED MAY 6, 1907.

911,013.

Patented Jan. 26, 1909.

WITNESSES:
Fred H Miller

INVENTOR
Henry D. James
BY
Wesley G. Carr
ATTORNEY

UNITED STATES PATENT OFFICE.

HENRY D. JAMES, OF PITTSBURG, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM.

No. 911,013.  Specification of Letters Patent.  Patented Jan. 26, 1909.

Application filed May 6, 1907. Serial No. 372,135.

*To all whom it may concern:*

Be it known that I, HENRY D. JAMES, a citizen of the United States, and a resident of Pittsburg, in the county of Allegheny and State of Pennsylvania, have invented a new and useful Improvement in Motor-Control Systems, of which the following is a specification.

My invention relates to systems of control for electric motors, and it has for its object to provide means for neutralizing the detrimental effect of sudden fluctuations in the load applied to electric motors that shall be simple in arrangement and automatically responsive to variations in current in the supply circuit.

Planers and other machines of a similar character are usually arranged to operate at relatively high speeds during their return strokes, or while the planer beds are moving in one direction, and to operate at considerably lower speeds during the working strokes, or while the planer beds are moving in the opposite direction. Clutch devices are usually provided for varying the speed and direction of motion of these machines in order that their driving motors may operate continuously in one direction. When the clutch device is actuated to reverse the direction of the planer bed and to increase its speed at the end of the working stroke, the motor is heavily loaded for a short interval of time, especially when operating a large planer having very heavy movable parts, on account of the inertia which must be overcome.

According to my present invention, I avoid injury, under conditions such as those described in the foregoing paragraph, by automatically and temporarily inserting a resistance in the motor circuit so that the torque of the motor may be increased without abnormally increasing the value of currents supplied thereto.

Figure 1:
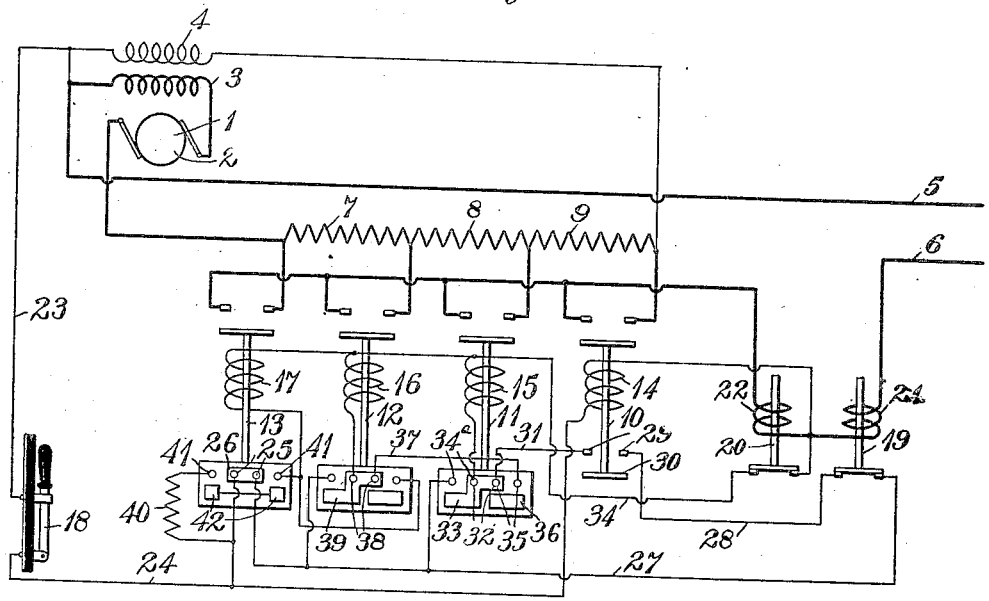
Figure 2:
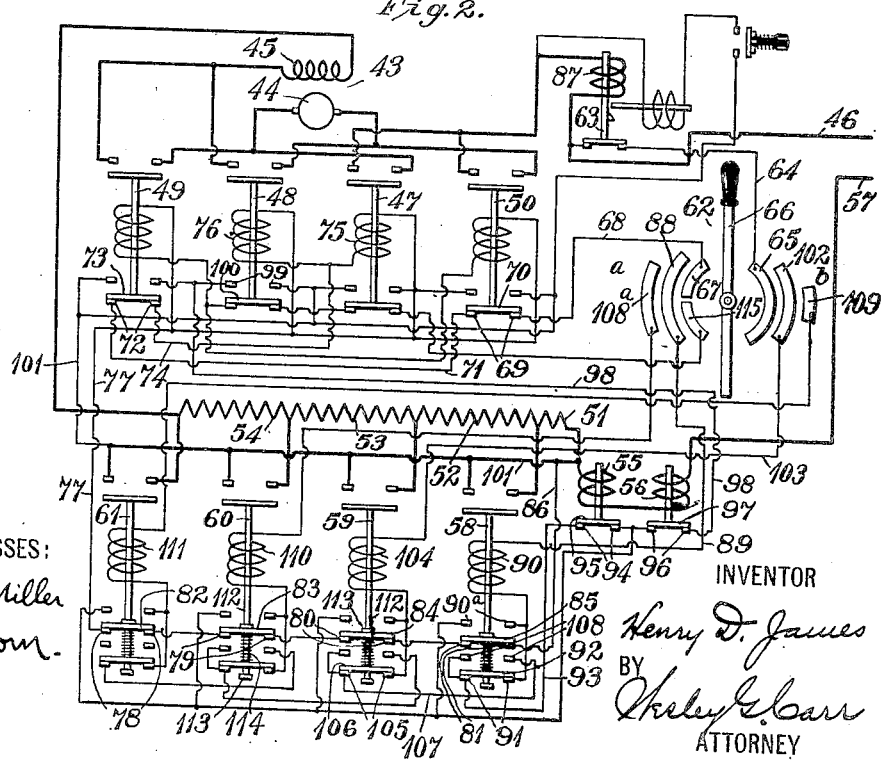

Figure 1 of the accompanying drawing is a diagrammatic view of a control system embodying a non-reversing compound-wound motor, and Fig. 2 is a similar view of a system embodying a series motor and means for reversing the direction of its rotation, both of the systems being constructed and arranged in accordance with my invention.

Referring to Fig. 1, an electric motor 1 having an armature 2, series field magnet winding 3 and shunt field magnet winding 4 may be supplied with electrical energy from any suitable source through line conductors 5 and 6. The motor is provided with an accelerating resistance comprising sections 7, 8 and 9, the circuit connections and the amount of resistance included in the motor circuit being controlled by a series of independently operated switches 10, 11, 12 and 13 having actuating magnets 14, 15, 16 and 17 that are governed by a master switch 18 and by a limit switch 19 and a safety relay switch 20 having operating magnet windings 21 and 22 that are connected in series with the supply circuit, said limit and relay switches being adapted to respectively protect the motor during its acceleration and its operation, as hereinafter more fully explained.

The operation of the system is as follows: Assuming that the motor is at rest; that the switches 19 and 20 are closed, and that the switches 10, 11, 12, 13 and 18 are open; if the master switch 18 is closed, circuit connections are established from the positive line conductor 5 through conductor 23, switch 18, conductor 24 and magnet winding 14 of switch 10, to negative line conductor 6. As soon as the switch 10 is closed the motor circuit is established from conductor 5 through a series field magnet winding 3, armature 2, resistance sections 7, 8 and 9 and switch 10 to the negative conductor 6, circuit connections being also established through the shunt field magnet winding 4. The magnet winding 21 of the switch 19 is energized and the switch may be temporarily opened by the current traversing the motor circuit until the speed and counter electromotive force of the motor have reached predetermined values. As soon as the switch 19 is closed, circuit is established from the conductor 24 through stationary contact terminals 25 (which are bridged by a movable contact member 26 when the switch 13 is open), conductor 27, the switch 19, conductor 28, stationary contact terminals 29 (which are bridged by a movable contact member 30 when the switch 10 is closed), conductor 31, stationary contact terminals 32 (which are bridged by a movable contact member 33 when the switch 11 is open), magnet winding 15, conductor 34 and the switch 20 (which is closed under normal load), to negative line conductor 6. The closure of the switch 11 short-circuits the resistance section 9 and establishes a circuit directly from the conductor 27 through stationary contact terminals 34ᵃ (which are bridged by the contact member 33) and the magnet winding 15 so that an accelerating switch, when closed, becomes independent of the limiting switch 19, in a well known manner, and a circuit is established from the conductor 27 through the switch 19, conductor 28, switch 10, stationary contact terminals 35 (which are bridged by a contact member 36 when the switch 11 is closed), conductor 37, contact terminals 38 (which are bridged by contact member 39 when the switch 12 is open), magnet winding 16 and conductor 34 to the negative line conductor 6. When the switch 12 is closed the resistance section 8 is short-circuited, provided the limit switch 19 is closed, and such circuit connections are provided as will insure closure of the switch 13 to short-circuit all of the resistance sections 7, 8 and 9. When the switch 13 is closed the circuits which were established through the contact member 26 and the conductor 27 are interrupted by reason of the disengagement of the contact terminals 25 from this contact member, and a circuit is completed from the conductor 24 through a resistance 40, contact terminals 41 (which are bridged by a movable contact member 42), magnet coils 17, conductor 34 and switch 20 to the negative line conductor 6, consequently, at this point, the resistance sections 7, 8 and 9 are short-circuited through the switch 13 and the switches 11 and 12 are permitted to open.

It will be observed that the automatic acceleration of the motor, which is effected by the switches 10, 11, 12 and 13, is retarded by the limit switch 19, which serves, in a well known manner, to protect the motor. If the motor load is materially increased during its accelerating period or during its full speed period, so that the current flowing in the supply circuit exceeds a predetermined amount, the switch 20 is opened by its magnet winding 22, and the magnet winding 17 of the switch 13 is immediately deënergized. If the switches 11 and 12 are opened, as already explained, the opening of the switch 13 introduces the resistance sections 7, 8 and 9 into the armature circuit of the motor, the steps taken in the acceleration of the motor are repeated and the windings of the motor are not injured. If the switch 13 is open and either or both of the switches 11 and 12 are closed, they will be opened and the resistances 8 and 9 re-inserted when the switch 20 is opened.

It will be readily understood that the improvement of my present invention may be applied to systems of control for electric motors which are adapted for various uses and which may be either series or compound wound, and either reversing or non-reversing.

Reference may now be had to Fig. 2, in which a series wound motor is shown, independently operated switches being employed for determining the direction of rotation of the motor as well as for effecting its acceleration. A motor 43, having an armature 44 and a field magnet winding 45, is supplied with energy from a supply line conductor 46 through reversing switches 47, 48, 49 and 50, resistance sections 51, 52, 53 and 54, and series magnet windings 55 and 56 to a negative line conductor 57. The resistance sections may be short-circuited by switches 58, 59, 60 and 61, the reversing switches and the resistance control switches being electrically operated and being governed by a master switch 62.

The master switch 62 is adapted to occupy either a forward position $a$ or a reverse position $b$. Assuming that the master switch is moved from its "off" position toward the position $a$, a circuit is first completed from the positive line conductor 46 through an overload release circuit-breaker 63 and conductor 64 to a stationary contact member 65 of the master switch 62. As the movable contact arm 66 is moved toward position $a$, a circuit is first completed from the stationary contact member 65, through contact arm 66, stationary contact member 67, conductor 68, contact members 69 (which are bridged by movable contact member 70 when the switch 50 is open), conductor 71, contact members 72 (which are bridged by contact member 73 when the switch 49 is open), conductor 74, magnet windings 75 and 76 of the switches 47 and 48, conductor 77, stationary contact members 78, 79, 80 and 81 (which are bridged by contact members 82, 83, 84 and 85 when the switches 61, 60, 59 and 58 are open), conductor 86 and magnet windings 55 and 56, to the negative line conductor 57. As soon as the switches 47 and 48 are closed, the motor circuit is established from line conductor 46 through magnet winding 87 of circuit-breaker 63, switch 47, armature 44 of the motor 43, switch 48, series field magnet winding 45, resistance sections 54, 53, 52 and 51, and magnet windings 55 and 56, to the negative line conductor 57. The motor 43 is thus connected across the line in series with a suitable resistance, according to well-known practice.

As the movable contact arm 66 continues to approach the position $a$, a circuit connection is established from the contact member 65 through contact member 88, conductor 89, magnet winding 90 of the switch 58, stationary contact members 91 (which are bridged by contact member 92 when the switch 58 is open), conductor 93, contact members 94 (which are bridged by a contact member 95 when the relay switch 55 is closed), contact members 96 (which are bridged by a contact member 97 when the switch 56 is closed), conductor 98, contact members 99 (which are bridged by a contact member 100 when the switch 48 is closed), and a conductor 101, to the negative line conductor 57. In this way, the operating magnet winding 90 of the switch 58 is energized and this switch is closed, provided the limit switch 55 and the reversing switch 48 are closed. The limit switch 55 corresponds to the switch 20 of Fig. 1 and serves to retard the short-circuiting of the resistance sections, in a well-known manner. As soon as the switch 58 is closed, a circuit is established from conductor 89 through its magnet coil 90, contact members 90ª (which are bridged by contact member 85), and switch 56 to conductor 98, the circuit being completed from this point, as above indicated.

When the movable contact arm 66 engages stationary contact member 102, a circuit is established from the contact member 65 through conductor 103, magnet winding 104 of the switch 59, contact members 105 (which are bridged by contact member 106 when the switch 59 is open), conductor 107, contact members 108 (which are bridged by contact member 92 when the switch 58 is closed), to conductor 93, from which point the circuit is completed as above traced. As the contact arm 66 successively engages contact members 108ª and 109, a circuit is established from the positive line conductor to magnet windings 110 and 111 of the switches 60 and 61. The closure of auxiliary switches 58 to 61, inclusive, may be delayed for an indefinite time by an attendant who operates the master switch, but the switches are so interlocked as to necessitate their closing in predetermined sequence, and the minimum time in which they may be closed is automatically determined by the limit switch 55. The relation between the switches 60 and 59 and between switches 61 and 60 is the same as that existing between the switches 59 and 58, the circuit connections for which have already been traced. It will be observed that, as each switch is closed, the circuit through its magnet winding becomes independent of the limit switch 55 but is still dependent upon the safety relay switch 56. The movable contact members 92 and 85 and 106 and 84, and the corresponding parts of the other auxiliary switches are adjustably mounted on the rods 112 (which are provided with collars 113 to limit the adjustment of the contact members) and are held in engagement with the contact members 91 and 105, when the switches 58 and 59 are open, by springs 114, which are interposed between contact members 84 and 85 and the contact members 92 and 106. The arrangement of parts is such that the contact members 84 and 85 engage stationary contact members 90ª, when the switch 58 is closed, before the contact members 92 and 106 are disengaged from the stationary contact members 91 and 105. In this way, the circuit of the operating magnet windings is not interrupted.

If the master switch is moved to position $b$, instead of to position $a$, a circuit will first be completed from the contact member 65 to a contact member 115, which corresponds to the contact member 67 in the forward rotation of the motor. If the switches 47 and 48 are both open, the switches 49 and 50 may be closed and a motor circuit established from the positive line conductor 46 to switch 50, the armature 44 of the motor 43, switch 49, series field magnet winding 45, and the accelerating resistance to the negative line conductor, the direction in which the energy flows through the motor armature being reversed when these switches are closed.

As explained in connection with Fig. 1, if the electric current traversing the line exceeds a predetermined amount on account of a sudden increase in motor load, the safety relay 56 will open and the starting resistance will be temporarily re-inserted. If a short-circuit occurs in the motor or if the current traversing the motor circuit exceeds a still higher predetermined value, the circuit-breaker 63 will be opened and the control circuits established through the conductor 64 will be broken. In this way, the reversing switches, as well as the accelerating switch, will open and the motor circuit will be interrupted.

Variations in the circuit connections may be effected within the scope of my invention, and I desire that only such limitations be imposed as are indicated in the appended claims.

I claim as my invention:

1. In a control system, the combination with an electric motor, an accelerating resistance therefor, and a series of short-circuiting switches for the resistance, of means, dependent upon a predetermined motor load, for automatically and simultaneously opening the switches to re-insert resistance.

2. In a control system, the combination with a supply circuit, an electric motor, an accelerating resistance therefor, and a series of automatically operated short-circuiting switches that are adapted to close in a predetermined sequence, of automatic means, dependent upon a predetermined motor load, for simultaneously opening the switches to temporarily re-insert resistance.

3. In a control system, the combination with a supply circuit, an electric motor, an accelerating resistance therefor, and a series of automatically operated short-circuiting switches that are adapted to close in a predetermined sequence, of automatic means, dependent upon a predetermined current in the motor supply circuit, for simultaneously opening the switches to temporarily re-insert resistance.

4. In a control system, the combination with an electric driving motor and a starting resistance therefor, comprising a plurality of sections, of means, dependent upon a predetermined current in the motor supply circuit, for automatically and simultaneously re-inserting the several sections of the starting resistance.

5. In a control system, the combination with a supply circuit, an electric motor connected thereto, an accelerating resistance for the motor, comprising a plurality of sections that are adapted to be short-circuited in a predetermined sequence, of automatic means for simultaneously re-inserting the resistance sections under predetermined current conditions in the circuit.

6. The combination with an electric circuit, switches that are adapted to close in a predetermined sequence, and an automatic limiting device which retards the operation of such switches, of means for automatically opening said switches when the current in the circuit exceeds a predetermined amount.

7. In a system of electric motor control, the combination with switches that are adapted to close in a predetermined sequence, of a limiting device which retards the closure of the switches, and automatic means, dependent upon a predetermined motor load, for opening the switches after they are closed.

8. In a control system, the combination with an electric motor, a resistance therefor, a plurality of resistance control switches that are adapted to close in a predetermined sequence, and an automatic limiting device which retards the operation of the switches, of means, dependent upon a predetermined motor load, for automatically opening the switches after they are closed.

9. In a control system, the combination with an electric motor, a resistance therefor, a plurality of resistance control switches that are adapted to close in a predetermined sequence, and an automatic limiting device which retards the operation of the switches, of means, dependent upon a predetermined current in the motor circuit, for automatically opening the switches.

10. In a control system, the combination with an electric motor, a starting resistance therefor, a plurality of control switches for the resistance that are adapted to close in a predetermined sequence, and a limiting device for retarding the closure of the switches, of a switching device which is adapted to open the switches and to re-insert the resistance, and an operating magnet winding for said switching device that is connected in series with the motor circuit.

11. In a control system, the combination with a supply circuit, an electric motor connected thereto, a subdivided accelerating resistance for the motor, and means for short-circuiting the resistance by successive subdivisions, of a series relay switch dependent upon predetermined current conditions in the motor circuit for re-inserting the entire resistance at once.

In testimony whereof, I have hereunto subscribed my name this 29th day of April, 1907.

HENRY D. JAMES.

Witnesses:
Ross W. COPELAND,
BIRNEY HINES.